United States Patent
Gudan et al.

(10) Patent No.: US 6,256,682 B1
(45) Date of Patent: Jul. 3, 2001

(54) SIGNALING OF POWER MODES OVER AN INTERFACE BUS

(75) Inventors: Kenneth F. Gudan, Sunnyvale; Douglas M. Farrar, Los Altos; Christoph H. Krah; Richard D. Cappels, Sr., both of San Jose, all of CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 09/190,379

(22) Filed: Nov. 10, 1998

Related U.S. Application Data

(60) Provisional application No. 60/084,429, filed on May 6, 1998.

(51) Int. Cl.[7] .......................... G06F 13/14; G06F 13/20
(52) U.S. Cl. .............. 710/14; 710/18; 713/300; 713/310; 713/320
(58) Field of Search ................... 713/300, 310, 713/320; 710/14, 18

(56) References Cited

U.S. PATENT DOCUMENTS

| | | | |
|---|---|---|---|
| 5,606,704 | * | 2/1997 | Pierce et al. .................. 395/750 |
| 5,737,616 | * | 4/1998 | Watanabe ................. 395/750.08 |
| 5,778,237 | * | 7/1998 | Yamamoto et al. ......... 395/750.04 |
| 6,026,288 | * | 2/2000 | Bronner ........................ 455/343 |
| 6,040,845 | * | 3/2000 | Melo et al. .................... 345/520 |

* cited by examiner

*Primary Examiner*—Thomas Lee
*Assistant Examiner*—Rehana Perveen
(74) *Attorney, Agent, or Firm*—Blakely, Sokoloff, Taylor & Zafman

(57) ABSTRACT

A power-up switch circuit in a peripheral device such as a keyboard is coupled to the main processing portion of a computer via an interface bus. The switch circuit together with bias and detection circuitry in the main processing portion allow non-intrusive use of a data communication line of the interface for controlling the supply of power to the main processing portion, without requiring a dedicated power-on wire between the peripheral device and the processing portion. A repeater circuit between the keyboard and the main processing portion causes a second signal to be sent through an upstream portion of the interface bus in response to receiving a first signal through a downstream portion of the bus, while the main processing portion is in low power mode. The repeater is also configured to not affect the interface bus when the main processing portion is in high power mode.

29 Claims, 9 Drawing Sheets

SIGNALING OF POWER MODES OVER AN INTERFACE BUS

This application claims the benefit of the earlier filing date of co-pending provisional application of Gudan and Farrar entitled, "Non-Intrusive Power-Up Switch Mechanism Over an Interface Bus" filed May 6, 1998, Ser. No. 60/084,429 and incorporated herein by reference.

BACKGROUND INFORMATION

1. Field of the Invention

This invention is generally related to power-up switch mechanisms in computer systems and more particularly to power-up switch circuits used in peripheral devices and with interface buses.

2. Description of Related Art

Various techniques for controlling electrical power supplied to a computer system have been developed over the years to provide the user with a convenient way to turn on and turn off the computer system. One recent innovation has been to equip a peripheral device such as a keyboard with a switch to control the supply of main power to the desktop computer. This allows the user to easily turn on and turn off the desktop computer while the main processing portion including the motherboard and disk drive is located farther than the user's hand can reach. FIG. 5 shows such a prior art design.

FIG. 5 shows a keyboard 512 equipped with a normally open push-button switch 502 for controlling the power supply to the main processing portion. The conveniently located switch 502 is connected to a dedicated power-on wire 508 which is part of the Apple Desktop Bus™ 510 (ADB) that couples the keyboard 512 to the processing portion 514. The bus 510 also includes power, return and data wires that provide power to the keyboard from the main supply (not shown), and transmission of data representing keystrokes on the keyboard. The dedicated power-on wire 508 is not used for data transmission and is biased via a pull-up resistor 504 to a trickle power source. When the user presses the push-button switch 502 in the keyboard, the dedicated power-on wire is connected to common return signaling a desire to turn on or turn off the power. When the push-button switch is depressed again after main power has been turned on, the dedicated power-on wire is once again connected to the common return.

A problem with the prior art design in FIG. 5, however, is that a dedicated wire is required for controlling the power. Modern and future computer peripheral interface bus standards, however, do not always provide for a dedicated power-on wire. These include, for instance, the Universal Serial Bus (USB) which only defines data, power, and return wires as part of the peripheral interface bus. Therefore, what is needed is a novel design for controlling power in computer systems which does not require a dedicated wire as part of the interface bus.

SUMMARY

The invention is directed at a non-intrusive power-up mechanism over an interface bus, which does not require a dedicated wire. In one embodiment, a peripheral device has a switch circuit coupled to a main processing portion of a computer by an interface bus, the switch circuit being configured to send an activated status signal through the interface bus in response to being activated. The status signal is for causing the main processing portion to enter a high power mode. The switch circuit and the processing portion are further configured to not directly affect the interface bus in response to the switch circuit being activated while the processing portion is in the high power mode.

The switch circuit may be coupled to the processing portion by a data line of the interface bus. The processing portion further includes a bias circuit coupled to a secondary power source for applying a bias signal to the interface bus in response to the processing portion being in low power mode and for removing the bias signal in response to high power mode. In a particular embodiment, the switch circuit features a mechanical switch coupled to the processing portion by the interface bus, and an enable/disable circuit coupled to mechanical switch for preventing the mechanical switch from directly affecting the bus during high power mode.

In a further embodiment, the processing portion is configured to execute software that prompts a user to decide whether or not to cause low power mode in response to receiving a notify data signal over the interface bus, where the notify data signal was generated by a switch detect circuit in the peripheral device.

In yet another embodiment, a repeater circuit is provided as part of a device coupled to the interface bus. The repeater circuit causes a second signal to be sent through an upstream portion of the interface bus in response to receiving a first signal, e.g., the activated status signal, through a downstream portion of the bus while the main processing portion is in lower power mode.

BRIEF DESCRIPTION OF THE DRAWINGS

These and other features as well as advantages of the different embodiments of the invention will be apparent by referring to the drawings, detailed description and claims below, where:

DETAILED DESCRIPTION

As briefly summarized above, the embodiments of the invention permit a power-up switch circuit aboard a peripheral device to control a supply of power in the main processing portion of a computer without requiring a dedicated power-on wire as part of the interface bus that couples the peripheral device to the main processing portion. One embodiment of the invention is particularly suitable for use with the USB computer peripheral interface standard, although other peripheral interfaces may be used which also do not provide a dedicated power-on wire.

Figure 1:
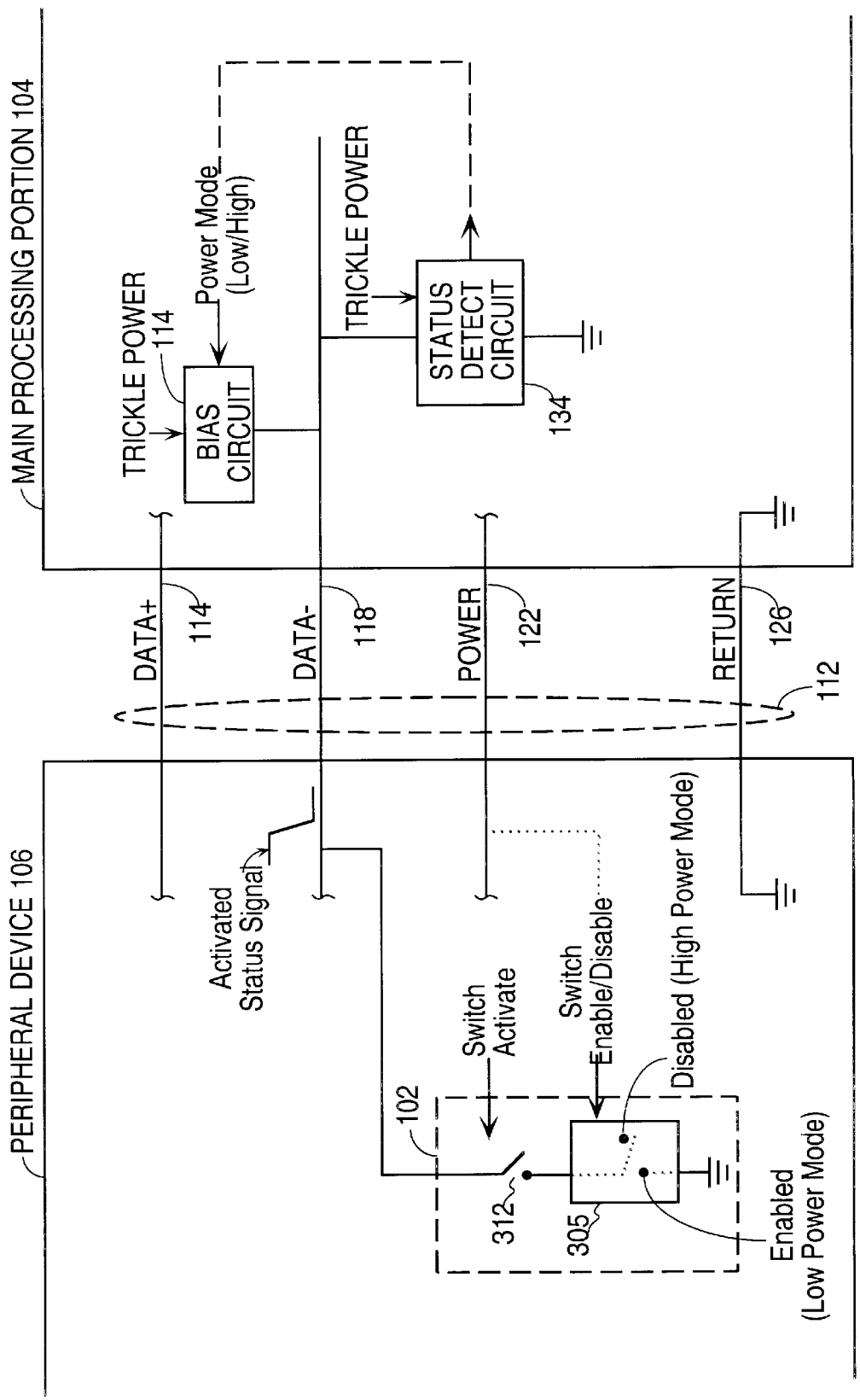
FIG. 1 shows a main processing portion and peripheral device as part of a computer system according to an embodiment of the invention.

FIG. 1 illustrates a first embodiment of the invention as a block diagram of a computer system configured with a power-up switch circuit 102 in the peripheral device 106. A bias circuit 114 and status detect circuit 134 are in the main processing portion 104. An interface bus 112 electrically connects the peripheral device 106 to the main processing portion. The interface bus 112 includes one or more data communication/transceiver lines DATA+114 and DATA−118, a power line 122, and a common return line 126. The power-up switch circuit 102 is coupled to the data line 118. The bias circuit 114 receives a secondary power source such as trickle power and provides an electrical bias signal to the data line 118 in response to a primary power signal.

When the power-up switch circuit 102 receives a switch activate command such as user pressing a button, an activated status signal is generated on the data line 118 and sent to the main processing portion. The status detect circuit 134 in response to receiving the activated status signal then causes the main processing portion to enter a high power mode. The trickle power may be supplied by a battery, by a regulator circuit that derives its power from a wall outlet, or by any other suitable means of providing a small amount of power sufficient to create the bias signal and operate the status detect circuit. Detailed examples of the bias circuit and the status detect circuit will be presented below in FIG. 3B.

Different ways of implementing the power-on switch circuit are contemplated, such as a mechanical switch in series with an enable/disable circuit as shown in FIG. 1. In FIG. 1, the power-up switch circuit includes in this embodiment a mechanical switch 312 in series with a switch enable circuit 305. The mechanical switch 312 may be of the momentary or push-button type. When the processing module is in low power condition, the power-up switch circuit 102 is enabled. When in the low power mode, the power-up switch circuit 102 is enabled by connecting one side of the mechanical switch 132 to common return with the other side being connected to the data line 118. The activated status signal is generated in the low power mode in response to the mechanical switch 312 being activated.

When in the high power mode, the power-up switch circuit 102 is disabled as shown in FIG. 1, where subsequent activations of the mechanical switch 312 do not load the data line 118. The high power mode also causes the removal of the bias signal that is applied to the data line 118 by the bias circuit 114. With this combination, subsequent activations of the switch circuit 102, through activation of the mechanical switch 312, do not directly affect the data line 118. In other words, activations of the switch circuit 102 do not prevent the data line 118 from operating as a data communication line between the peripheral device 106 and the main processing portion under normal conditions (e.g., coinciding with high power mode) specified for the interface bus 112.

Figure 2:
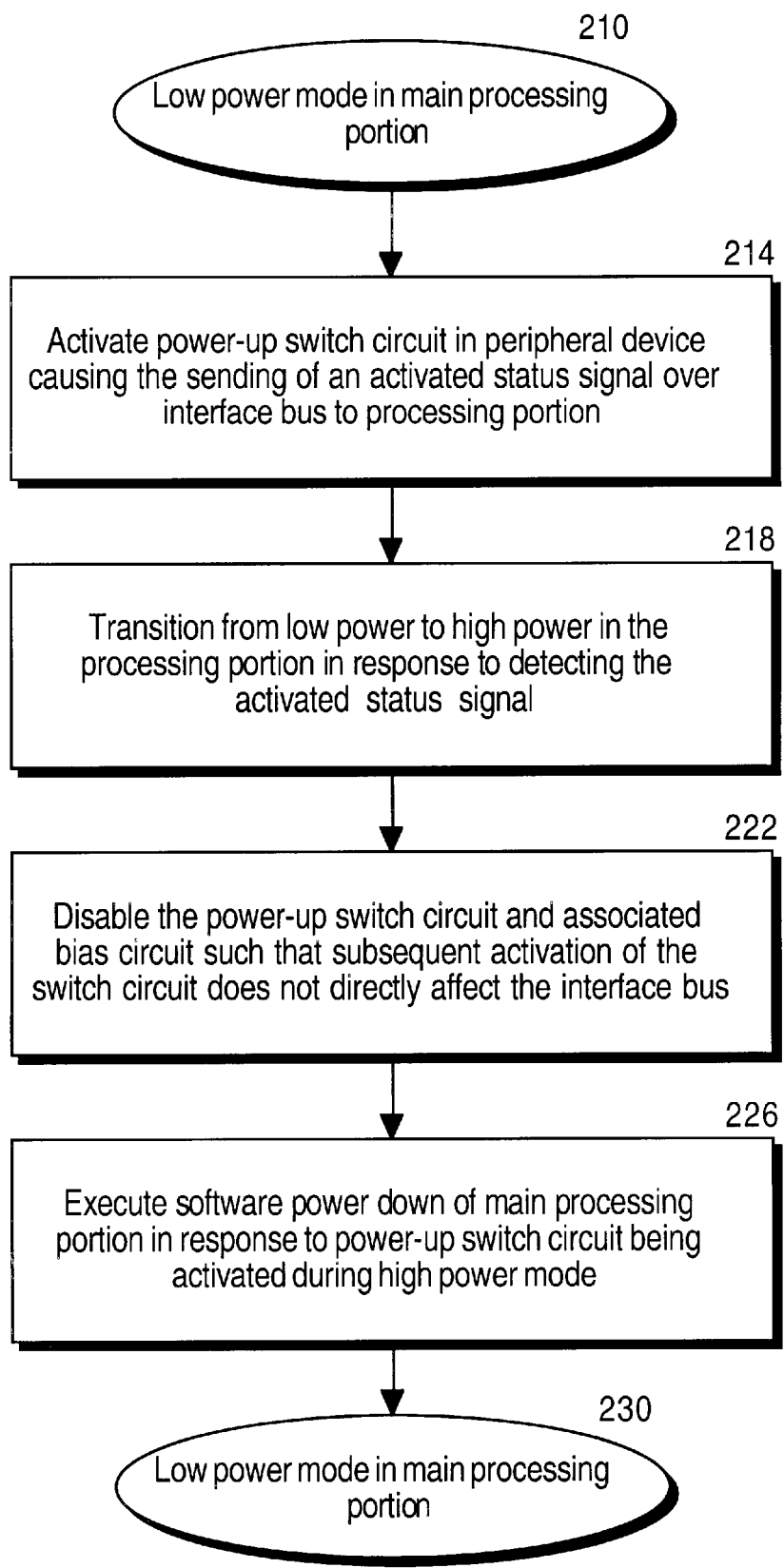
FIG. 2 is a flow diagram of operations performed using a computer system according to another embodiment of the invention.

FIG. 2 shows a flow diagram of steps to be performed using the computer system of FIG. 1 according to another embodiment of the invention. Operation normally begins in step 210 where the main processing portion is in the low power mode. This, for instance, corresponds to the condition where power is off to a processor and program memory in the processing portion. The user then activates the power-up switch circuit 102 in the peripheral device, as in step 214. This may be done by pressing a button, by giving a voice command, or other suitable means of conveying the user's desire to change from low power mode to a high power mode. The power-on switch circuit in the peripheral device is activated, thus causing the sending of an activated status signal over the peripheral interface bus to the main processing portion. In the particular embodiment of FIG. 1, the status signal is sent through the data line 118 normally used for data communication between the peripheral device and the main processing portion. Operation then continues with step 218.

In step 218, the main processing portion transitions from the low power mode to the high power mode in response to detecting the activated status signal. This detection is performed in the embodiment of FIG. 1 by the status detect circuit 134 which is energized by the source of trickle power. Operation then continues with step 222.

In step 222, the high power mode causes the power-up switch circuit in the peripheral device and the bias circuit in the main processing portion to be disabled, such that subsequent activation of the power-up switch circuit does not directly affect the data line 118 of the interface bus. In other words, during high power mode, the data line is not directly loaded, beyond that permitted for normal data communication, by the power-up switch circuit being activated. This is accomplished by electrically isolating the mechanical switch from common return using the disable switch circuit, and by disabling the bias circuit 114 during high power mode.

In another embodiment, the peripheral device is further configured to allow a return to low power mode using the same switch circuit 102. In that case, the peripheral device 106 is equipped with a switch detect circuit (not shown in FIG. 1, but see FIG. 3A embodiment described below) that operates transparently to detect activations of the switch circuit 102 during high power mode and accesses software in the main processing portion. In that case, operation continues in FIG. 2 with step 226. While the main processing portion is operating normally, the power-up switch is activated again. The switch detect circuit in the peripheral device detects this closure of the mechanical switch 312 (see FIG. 3A) and notifies software in the main processing portion of this condition. Thereafter, the main processing portion executes a software power-down routine that prompts the user as to whether or not the main processing is to be placed in low power mode. If the user so indicates, either through the peripheral device 106 itself being, for instance, a keyboard, or through other indicating means such as a mouse, then the main processing portion is returned to low power mode as indicated by step 230.

Figure 3A:
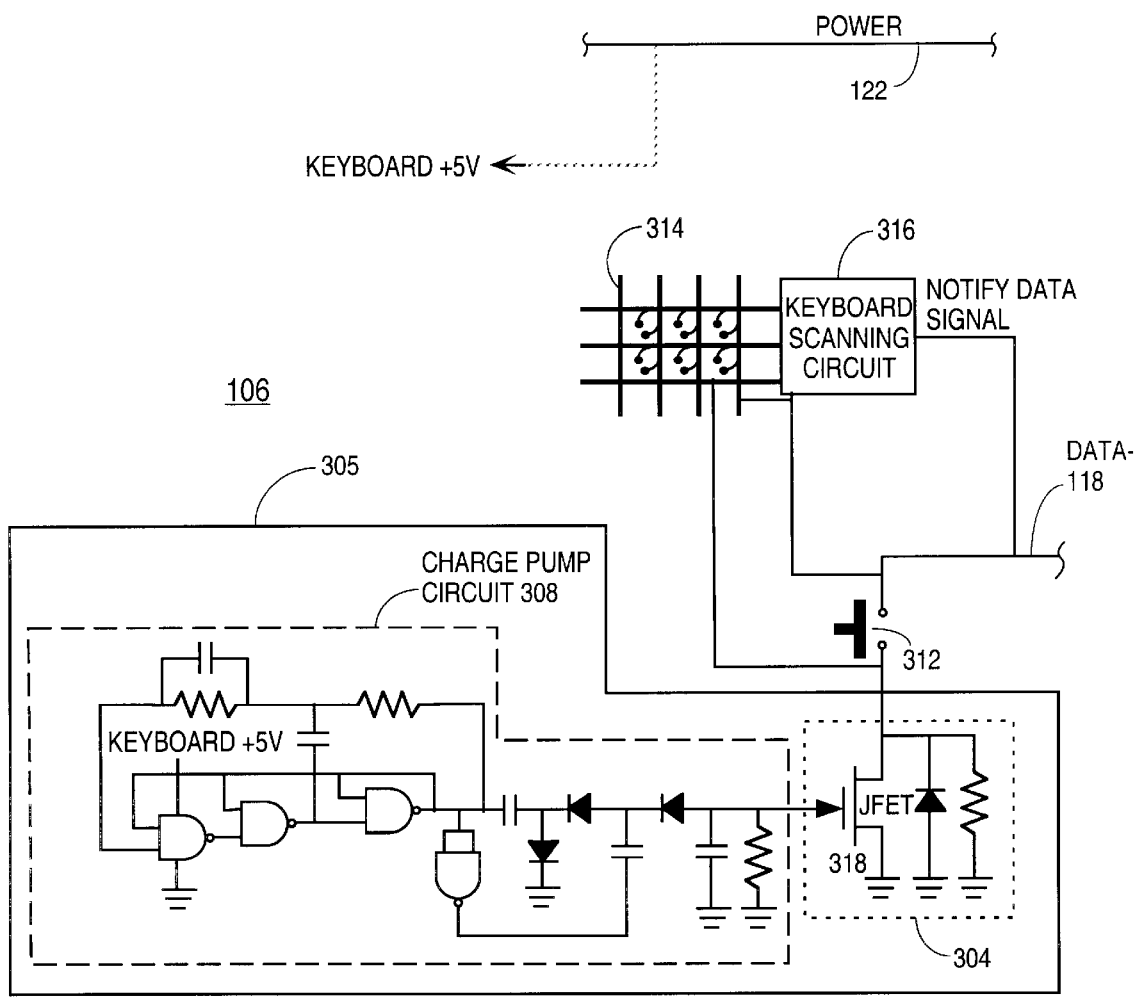
FIG. 3A shows a power-up switch circuit according to another embodiment of the invention.
Figure 3B:
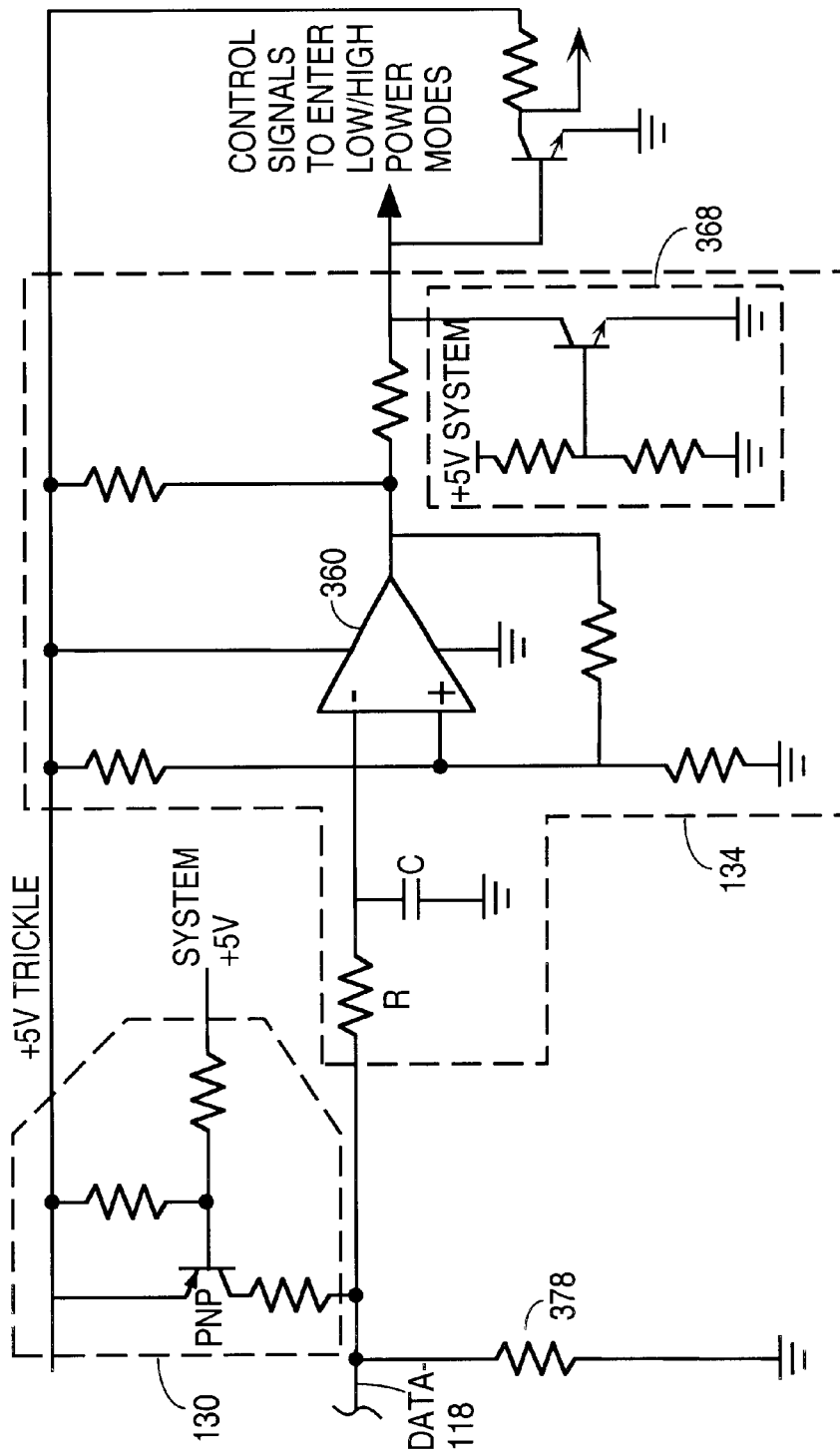
FIG. 3B shows a bias circuit and a status detect circuit according to one embodiment of the invention.

FIGS. 3A and 3B illustrate a more specific embodiment of the invention as part of a computer system configured with the power-up switch circuit 102. In this embodiment, the peripheral device 106 is a computer keyboard and the main processing portion 104 is part of a logic board of a desktop computer, such as a stand alone personal computer (PC) or a network computer. The interface bus 112 for this embodiment is configured according to USB Specification 1.0 Final Draft Revision, Nov. 13, 1995, which document is incorporated by reference herein.

The theory of operation of the circuitry of FIGS. 3A and 3B may be explained as follows. To avoid obscuring the invention, most of the values and types of passive and active components shown in the circuit schematics are not discussed. Such information can be readily developed by those of ordinary skill in the art based on the schematics and functional description below.

Considering the keyboard first in FIG. 3A, when keyboard power "KEYBOARD +5V" is off, a depletion mode N-channel junction field effect transistor (JFET) in circuit 304 has zero bias on the gate of the JFET. The JFET can thus conduct as determined by its $I_{DSS}$ parameter. The JFET is connected to one side of the mechanical switch 312 being, in this embodiment, a normally open push-button mechanical switch. In one embodiment, the mechanical switch 312 has a resistance of less than 500 ohms when closed. The other side of the mechanical switch 312 is connected to the line 118 of the interface 112. Any activation of the mechanical switch 312 will connect the line 118 to common return via a low impedance path through the JFET in circuit 304.

When KEYBOARD +5V appears, a charge pump circuit 308 having a square wave oscillator, based on a combination of CMOS NAND gates, begins to run. The charge pump circuit generates a sufficiently negative voltage to the gate of the JFET in circuit 304 that "turns off" or places the JFET in a low conductance mode. In this mode, the circuit 304 presents a sufficiently high impedance to switch 312 such that activating the mechanical switch 312 does not substantially and directly load the line 118, and thus does not affect normal operation of the line 118 as specified in the USB specification cited above.

Turning next to the logic board in FIG. 3B, when SYSTEM +5V is not available, the logic board is in the low power mode and +5V TRICKLE is available. This combination forces a PNP transistor in bias circuit 130 to be "turned on" or placed in a high conductance mode, driving approximately, in this embodiment, 300 $\mu$amperes into the line 118. A pull down resistor 378 as may be required by the USB specification is also provided on the line 118. Thus, with SYSTEM +5V off, a bias current is forced into the line 118, developing a voltage of approximately one-half of +5V on line 118. The signal on line 118 is also fed to the inverting input of a comparator 360. If, however, protection diodes are connected between DATA–118 and Power 122 (see FIG. 1), then the voltage on DATA–118 cannot exceed approximately 0.7 volts when the main processing portion 104 is in low power mode since Power 122 is at the same level as ground (RETURN 126 in FIG. 1). Thus, the bias current, the pull down resistor 378, and the threshold voltage at the non-inventing input of the comparator 360 should be accordingly adjusted when using protection diodes. If protection diodes are not used, the non-inverting input of the comparator 360 is set to approximately 0.5–0.6 volts using +5V TRICKLE.

The output of the comparator 360 provides an active high signal in response to the mechanical switch 312 being closed during low power mode. This occurs because in low power mode, SYSTEM +5V is not available and neither is KEYBOARD +5V, because KEYBOARD +5V is normally derived via power line 122 from SYSTEM +5V in the logic board. Thus, the charge pump circuit 308 is not operating, and the JFET can readily conduct, so that when the mechanical switch 312 is closed, the line 118 drops to a sufficiently low potential (less than 0.5–0.6 volt) at the inverting input of the comparator 360, causing the output of comparator 360 to go active signifying a desire to change from low power mode to high power mode. The active high signal from the comparator 360 is then used to cause SYSTEM +5V to appear in the logic board using circuitry not shown but which can be readily developed by those of ordinary skill in the art.

When SYSTEM +5V appears, this causes the bias current previously supplied by the PNP transistor in the bias circuit 114 (see FIG. 3B) to be cut off. The SYSTEM +5V also causes KEYBOARD +5V to appear in the keyboard (see FIG. 3A) causing the charge pump circuit 308 to operate and place the JFET in a non-conductive state. Thereafter, the line 118 will not be directly affected by the closing of the mechanical switch 312. Neither will the line 118 be affected by the now disabled bias circuit, or by the comparator 360 which has relatively high input impedance. Also, the RC combination at the inverting input of the comparator 360 should be selected to not substantially affect transceiver operation on the line 118 as specified by the USB specification. In general, the exact values of the passive electronic components and the type of active components, including the JFET in FIG. 3A and the PNP transistor in FIG. 3B, can be selected by one of ordinary skill in the art in view of the requirements for operating line 118 as a transceiver line.

So far, embodiments of the invention have been described which include a power-up switch circuit 102 in a peripheral device 106 coupled through an interface bus 112 to a main processing portion 104. A further embodiment was introduced in FIG. 2 where a software-accessing switch detect circuit is added to the peripheral device 106 to allow a software power down. Such an embodiment of the peripheral device 106 is illustrated in FIG. 3A, where the peripheral device 106 is a keyboard having a keyboard scanning circuit 316 for scanning keyboard switch grid 314 and the mechanical switch 312. By way of example, the switch 312 may be part of a conventional grid of keyboard switches. When the main processing portion is operating in high power mode, activation of the power-up switch circuit 102 is detected by the keyboard scanning circuit that scans the mechanical switch 312 in addition to the keyboard switch grid according to known conventional techniques. When an activation of mechanical switch circuit 312 is detected, a notify data signal is generated by the scanning circuit 316. The notifying signal may be sent to the processing portion 104 via the data lines 114 and 118 as part of normal data communication between the peripheral device and the main processing portion. The notify data signal can then interrupt a processor, or alternatively be interpreted as a result of polling by the processor. The processor may then perform a routine that prompts the user as to whether or not to enter low power mode in the main processing portion. An indication by the user to return to low power mode is then communicated back to the main processing portion (through normal data signaling on the data lines 118 and 114 of the interface bus). Thereafter, the main processing portion can be transitioned into a low power mode through conventional techniques.

Figure 4:
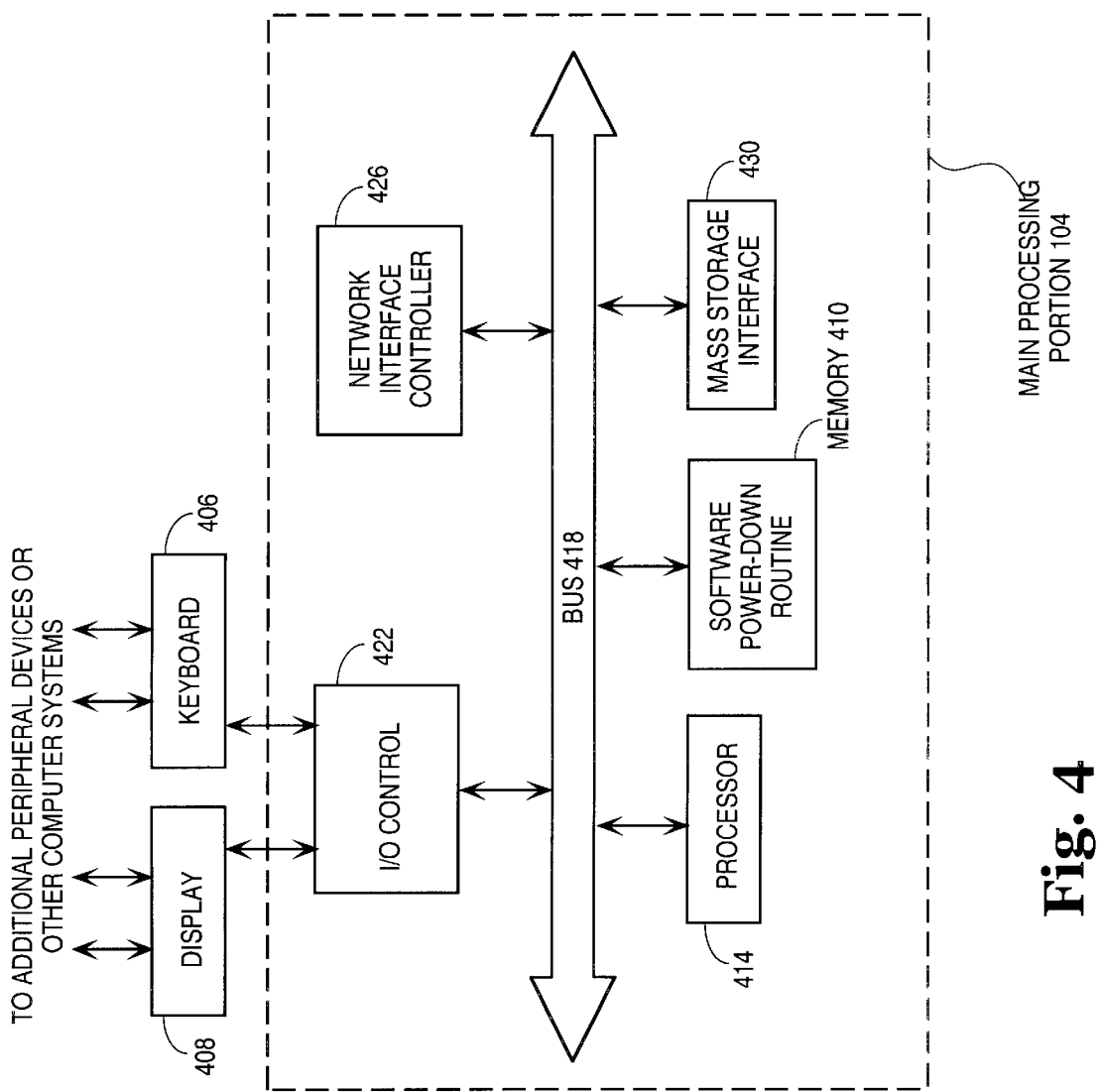
FIG. 4 is a block diagram of a computer system showing peripheral devices and a main processing portion according to an embodiment of the invention.
Figure 5:
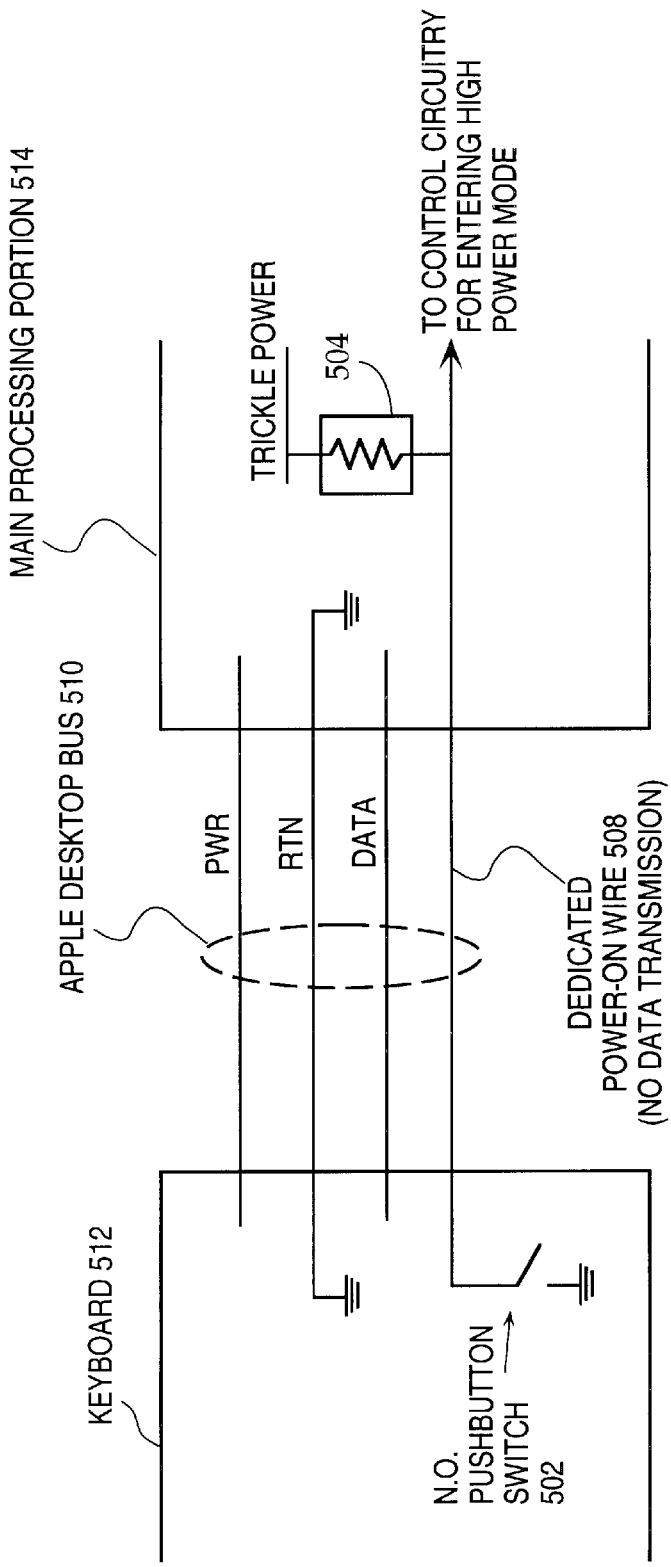
FIG. 5 shows a prior art technique of implementing a power-on switch aboard a peripheral device in a computer system.

FIG. 4 shows a block diagram of an exemplary main processing portion configured with a software power down routine. In this embodiment, the main processing portion can be the "motherboard" of a PC or a network computer. The motherboard has a processor 414 coupled to a memory 410 via a bus 418. An optional mass storage device (not shown), such as a hard disk drive may be coupled to the bus via the interface 430. The software power down routine normally resides in memory 410, but of course can also be stored in the mass storage device (not shown) or downloaded via a network interface controller 426.

An I/O control interface 422 provides access to various peripheral devices including, for instance, a keyboard 406 and a display 408. In one embodiment, the I/O control interface complies with the USB specification recited above. The USB allows additional peripheral devices to be connected to a hub (not shown) in either of the display 408 or keyboard 406. The circuitry in peripheral device 106 of FIGS. 1 and 3A may also be duplicated in the additional USB compliant peripheral devices, with the possible addition of a pull-up circuit (not shown) added to line 118 that may be needed to meet the requirements of the USB specification recited above. To properly detect an activated status signal from one of several power-up switch circuits connected to line 118, the voltage at the non-inverting input of the comparator 360, the bias current supplied by bias circuit 114, as well as other circuit parameters may need to be re-adjusted in view of the resistance of the mechanical switches 312 when closed. This latter enhancement allows power to the processing portion to be controlled via more than one peripheral device connected to the interface bus 112.

Figure 6:
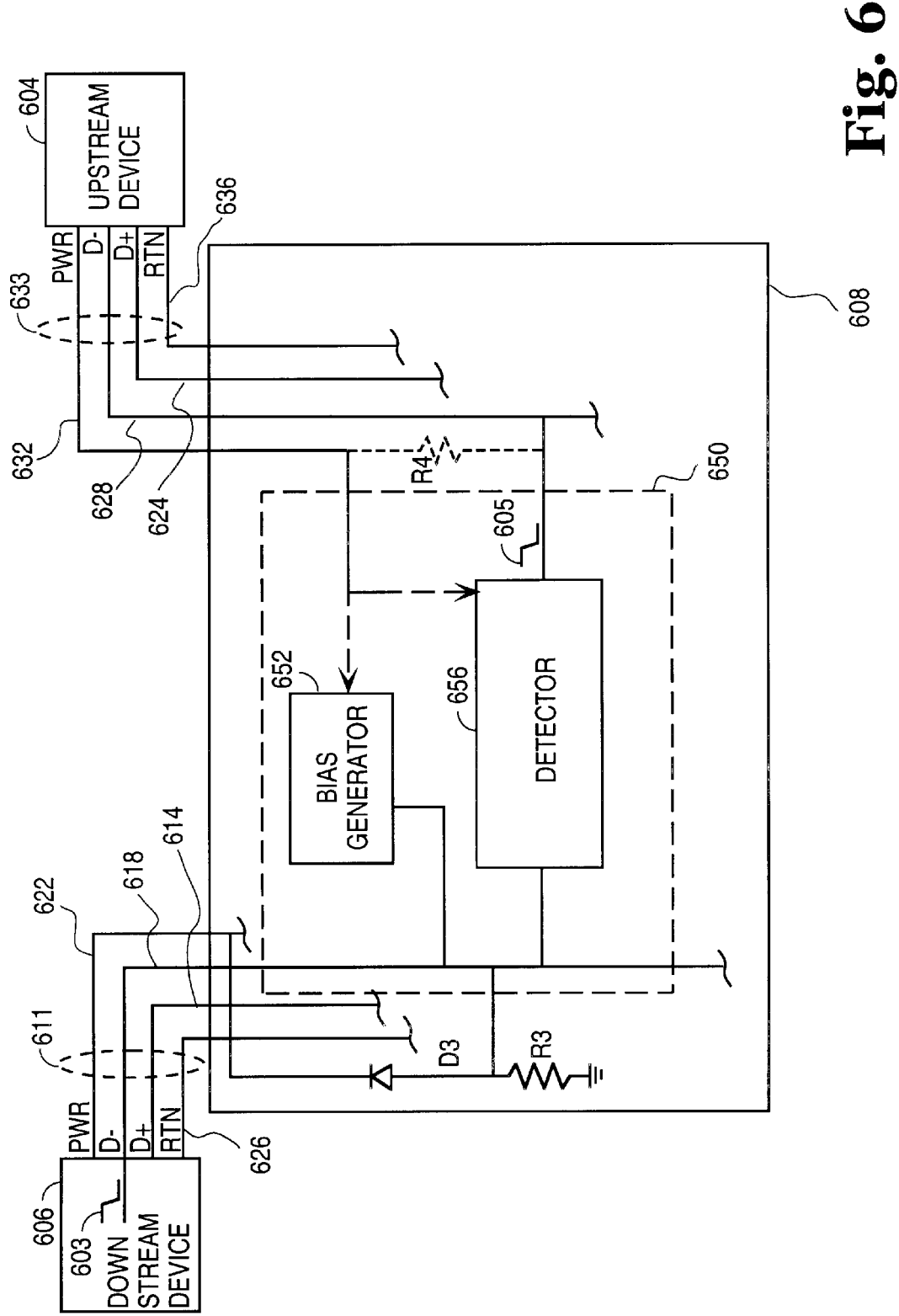
FIG. 6 is a block diagram of part of a computer system having a repeater circuit coupled to the interface bus, according to another embodiment of the invention.

FIG. 6 illustrates another embodiment of the invention for controlling power in the main processing portion. A data processing device 608 is coupled to an interface bus having a downstream portion 611 and an upstream portion 633. A downstream device 606 which may be a keyboard is coupled to the downstream portion. An upstream device 604 which may contain the main processing portion 104 of the computer system (See FIG. 1) is coupled to the upstream portion. The upstream device 604 communicates with the downstream device 606 via the data signaling lines D− and D+. The data signals on these lines are either relayed by the device 608, or simply travel through a direct connection in the device 608 between the corresponding D− and D+ lines of the upstream and downstream portions.

A repeater circuit 650 causes a second signal 605 to be sent through the upstream portion of the interface bus in response to receiving a first signal 603 through the downstream portion. The first and second signals occur while the main processing portion 104 is in low power mode. In this way, the repeater circuit 650 may be used to relay an activated status signal (see FIGS. 1 and 3A) from the downstream device to the upstream device to cause a power transition in the main processing portion. The repeater circuit 650 is configured to not affect normal data signaling over the interface bus when the main processing portion is in high power mode. In high power mode, the main processing functions of the computer system are operational, whereas in low power mode the processing functions have been in large part disabled, as in, for instance, in a stand-by condition.

The first signal 603 may be received on either downstream data signaling line D− 618 or D+ 614 of the downstream portion 611. The second signal may also be sent on either upstream data signaling line D− 628 or D+ 624 of the upstream portion 633. The D− line is only used here as an example. The first and second signals are propagated while the main processing portion is in low power mode. However, when the main processing portion is in high power mode, the repeater circuit 650 does not affect normal data signaling operation on the interface bus and in particular on the lines D− 618 and D− 628. This may be achieved in part using a bias generator 652 that provides a bias on D− 618 in response to the main processing portion being in low power mode. A detector 656 causes the second signal in response to detecting the first signal, where the first signal in this embodiment is a change in the voltage on D− 618. The low and high power modes of the main processing portion are sensed by the bias generator and the detector through the interface bus, namely through a PWR 632 line of the upstream portion 633. To not affect the data signaling lines during high power mode, the bias generator 652 removes the bias in response to sensing the high power mode on PWR 632. The detector is disabled during high power mode i.e., the detector will no longer respond to signals received on D− 618 and will not affect normal data signaling operation on D− 628.

When the main processing portion is in low power mode, it may be that the entire computer system, including the device 608, is also in a low power mode. In that case, the repeater circuit 650 is powered by a trickle power source (not shown) in the device 608.

Figure 7:
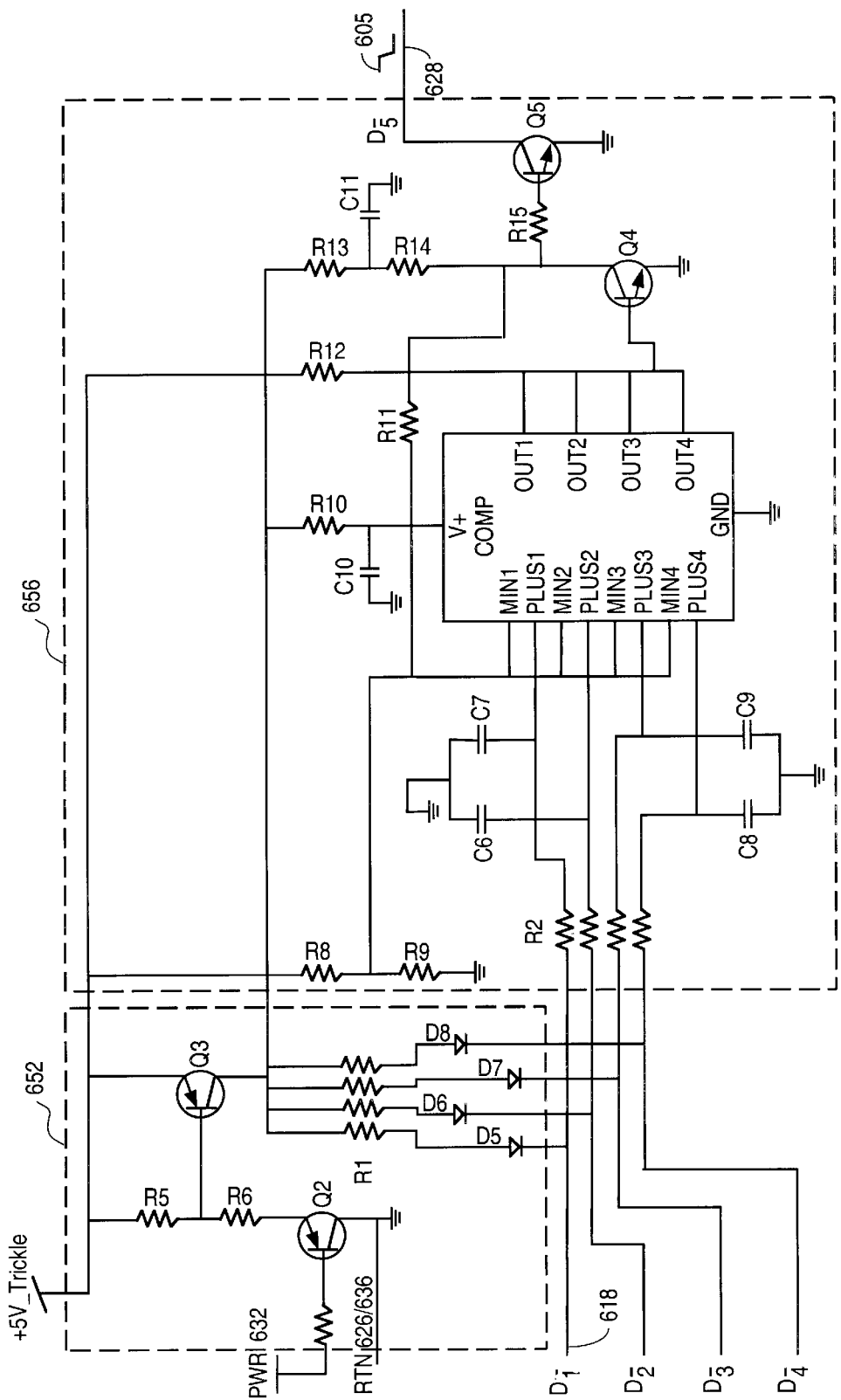
FIG. 7 shows a circuit schematic of the repeater circuit as an embodiment of the invention

The internal circuit implementation of the repeater 650 may be based on the schematic in FIG. 3B. There, the first signal is received on DATA−118 and the second signal is created using the control signals at the output of status detect circuit 134. FIG. 7 illustrates a schematic of another embodiment of the repeater circuit 650. In this embodiment, both the bias generator 652 and detector 656 are powered by a trickle power source. The repeater circuit 650 is capable of responding to a first signal on any one of four different data signaling lines D1−. . . D4−. The diodes D5 . . . D8 help isolate the D− lines from each other. For convenience, the description will only refer to circuit behavior with respect to signals on D1− which is identical to the behavior on the other D− data signaling lines. A computer system that takes advantage of such a capability for propagating any one of multiple first signals will be described below in connection with FIG. 8.

In a particular embodiment of the invention, the PWR 632 and PWR 622 lines are electrically connected in the device 608. This serves to transfer power between the upstream and downstream devices, such that for instance only the upstream device, containing the main processing portion, need be self-powered. When the main processing portion is in low power mode, the potential at PWR 632/622 is essentially the same as that of RTN 626 and RTN 636 which, in this embodiment, are electrically connected to ground in the device 608 (see FIG. 6). This causes transistors Q3 and Q2 to be forward biased thus causing Q3 to conduct. The combination of Q2 and Q3 inject only a very small amount of current into PWR 632. With Q3 conducting, the pull-up resistor R1 connected to the diode D5 forces a bias voltage on D1− 618. The device 608 may contain a protection diode D3 and a pull-down resistor R3 on D1− 618 and a pull-up register R4 on D1− 628 (see FIG. 6 momentarily) which form a voltage divider with R1. In that case, the maximum bias on D1− is approximately 0.7 volts since PWR 632 is grounded when the main processing portion is in low power mode. When the main processing portion enters high power mode and PWR 632 rises to +5 volts, Q3 stops conducting, leaving R1 floating. This removes the bias from D1− 618 and permits normal data signaling on D1−618.

The detector 656 features a comparator COMP that compares the DC level on D1− 618 to a threshold set by the resistor divider R8-R9. For instance, if the bias on D1−618 is 0.7 volts as described above, then the threshold may be set to 0.35 volts. However, other bias and threshold combinations may be used as can be appreciated by those of ordinary skill in the art. The comparator is powered through Q3, and is turned on when the main processing portion is in low power mode. Optional hysteresis is provided through the feedback resistor R11. Since the reference input (MIN1) of the comparator is inverted with respect to its output OUT1, an additional inversion performed by Q4 is necessary to generate the positive feedback for hysteresis. Resistors R14 and R15 are selected to provide the proper voltage to the feedback resistor R11. If hysteresis is not required, R11 can be removed and R14 adjusted accordingly. In this embodiment, the comparator has open collector outputs OUT1 . . . OUT4 which are wire-ORed and pulled up via R12 to the trickle power source. Other output configurations are possible as may be recognized by those of ordinary skill in the art.

In operation, when the main processing portion is in low power mode so that PWR 632 is grounded, the +5 volt trickle source allows a bias to be applied to D1– 618 by the bias generator 652. With the voltage on D1– 618 being greater than the MIN1 input of the comparator COMP, OUT1 is open collector which causes Q4 to conduct. This in turn shuts off the base current to Q5, thus preventing Q5 from conducting. The D5– 628 line is thus unaffected, and the stage is set to receive the first signal on D1– 618.

Thereafter, the first signal is created by altering the voltage on D1– 618. This may be caused by, for instance, activating a switch in the downstream device 606 (see FIG. 6). In one embodiment, the activated switch 312 may be part of the peripheral device 106 of FIG. 3a. In that case the potential at the PLUS1 input drops to less than MIN1, thus toggling OUT1. This in turn essentially eliminates the base current of Q4, preventing Q4 from conducting. Q5 in turn will conduct, thus lowering the voltage of D– 628, the latter event creating the second signal 605. The second signal 605 may then be detected by the upstream device 604 and cause the main processing portion 104 (see FIG. 6) to transition from the low power mode into high power mode.

Although FIG. 7 and the above describe a voltage signaling scheme, a current signaling scheme can alternatively be used. For instance, when the switch 312 is open, a current of approximately 0.5 mA is forced into D1– 618 through R1. When switch 312 is closed, the current increases to 1 mA, and the first signal may be sensed as a change in this current. In general, the signaling scheme may be implemented using different types of signals and different signal levels obtained by variations of the circuit topologies disclosed herein.

Referring briefly to FIG. 6, when the main processing portion 104 in the upstream device 604 has entered high power mode, the PWR 632 is at +5 volts. Continuing with FIG. 7, this causes removal of the bias from D1– 618 and allowing normal data signaling on that line. With Q3 not conducting, COMP is also in a low power mode such as stand-by or power off. Also, insufficient base current is supplied to Q5 such that Q5 does not conduct, thus not affecting normal data signaling on $D_5$– 628.

To prevent undesirable transient behavior by the repeater circuit 650, the combination of R2-C7 is provided as a filter to prevent false triggering of COMP while the main processing portion is in the low power mode. The R2-C7 combination helps filter any spikes on D1– 618, such as those caused by switch bounce when the first signal is being generated. In addition, to prevent erroneous generation of the second signal when +5V trickle first appears prior to the arrival of the first signal on D1– 618, a delay circuit comprising R13 and C11 is provided to turn off Q5 until the output of COMP has settled into a stable state. For proper operation, the time constant R13-C11 should be larger than R2-C7.

Figure 8:
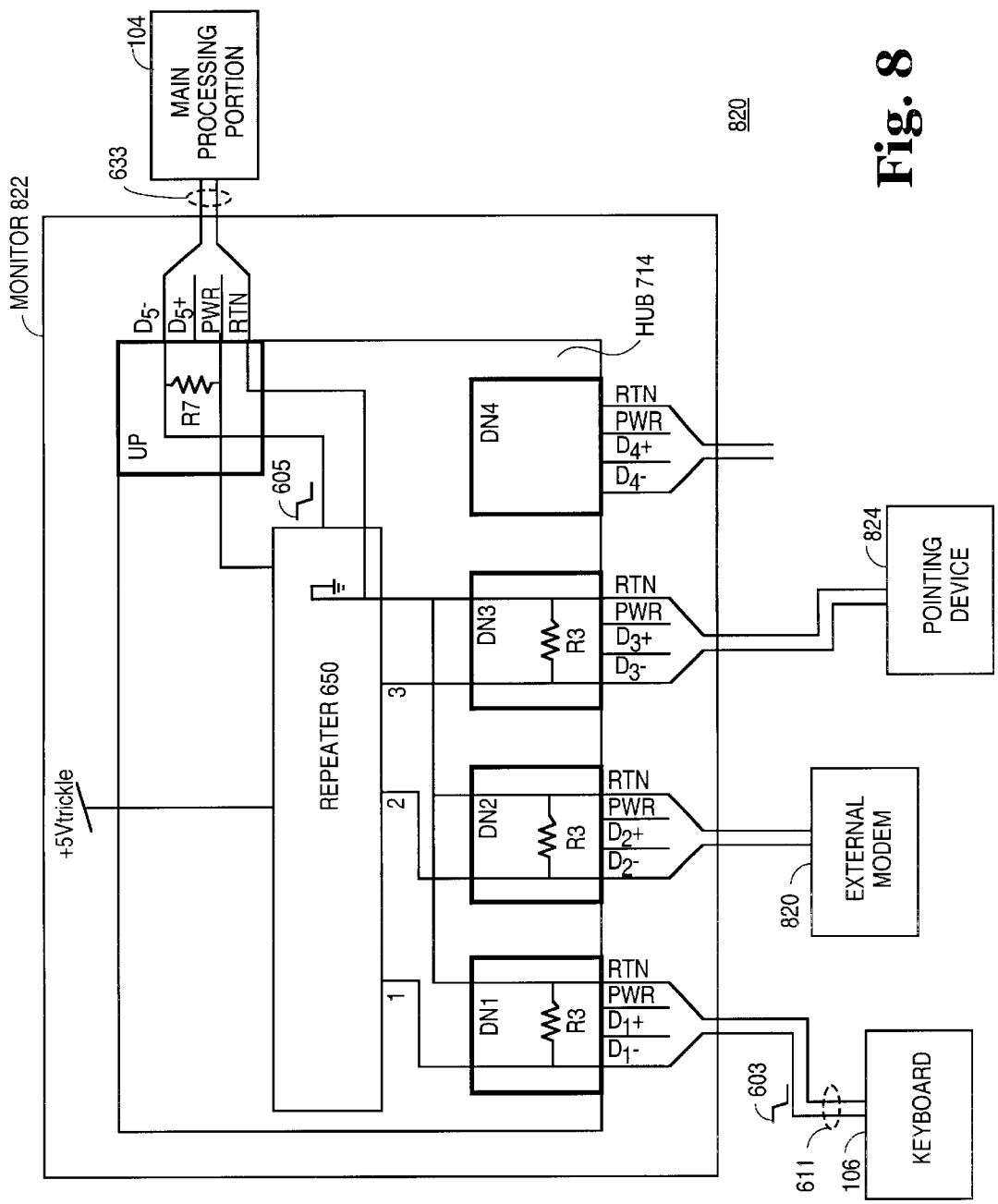
FIG. 8 illustrates an embodiment of the invention using the USB specification.

FIG. 8 illustrates another embodiment of the invention as a computer system 820. The computer system 820 comprises the main processing portion 104 having a bias and detection circuit as in FIG. 3b, a display monitor 822 containing a hub 714, and a number of peripheral devices such as an external modem 820, a pointing device 824 and the keyboard 106 having the switch circuit of FIG. 3a. The system 820 has an interface bus that complies with the USB specification. The hub 714 also complies with the USB specification and has a number of downstream ports DN1 . . . DN4 connecting the peripheral devices via separate downstream portions of the interface bus. An upstream port UP in the hub 714 is coupled to the main processing portion 104 via the upstream portion 633. The hub 714 permits the various devices coupled to the interface bus to communicate with one another over the D– and D+ lines using a poling scheme that complies with the USB specification. In accordance with the USB specification, a 15Ω pull down resistor R3 is normally provided on the D– line of each downstream port, and a 1.5Ω pull up resistor R7 in the upstream port.

The repeater circuit 650 is shown as part of the hub 714 and taps one or more of the data signaling lines D1–. . . D4–. The repeater circuit 650 receives power from a +5 volt trickle source in the monitor 822. The circuit 650 operates in response to low and high power modes detected through the PWR line of the upstream portion 633 connected to the upstream port UP. The RTN lines from the different portions of the interface bus are connected to each other and used as a ground (common return) by the repeater circuit 650. The monitor 822, using the repeater circuit 650, generates the second signal 605 through the upstream portion of the interface bus in response to receiving the first signal 603 from the keyboard 106, while the main processing portion 104 is in low power mode.

Power to the peripheral circuitry in the peripheral devices may be provided through the PWR and RTN lines of the interface bus. These devices may alternatively be self-powered. Also, although the monitor 822 is the currently preferred peripheral device for locating the repeater circuit 650, other peripheral devices could also be used to house the repeater circuit 650 between the main processing portion 104 and downstream peripheral devices. An alternative to a peripheral device could be a simple box containing the hub 714 without any computer peripheral circuitry. The repeater circuit 650 may also be manufactured as part of a circuit board or integrated circuit separate from the hub 714.

To summarize, the embodiments of the invention described above are techniques of achieving remote power control to a main processing portion of a computer. The embodiments of the invention allow a user to control, for instance, the turning on and off of main power in the computer from a peripheral device using an interface bus having multiple, separate, physical portions, without requiring a dedicated wire between the peripheral device and the main processing portion. The embodiments described above are, of course, subject to some variations in structure and implementation. For instance, although the keyboard is given as an example of a peripheral device that can be enhanced with switch circuit 102, other peripheral devices such as a mouse, a display, a scanner or even a modem may be so equipped. It is intended that all such modifications and variations falling within the spirit and scope of the invention be covered by the appended claims.

What is claimed is:

1. A computer system comprising:
    processing portion;
    interface bus; and
    peripheral device having a switch circuit coupled to the processing portion by the interface bus, the switch circuit being configured to send an activated status signal through the interface bus in response to being activated, the status signal for causing high power mode in the processing portion, the switch circuit and the processing portion being further configured to not directly affect the interface bus in response to the switch circuit being activated during high power mode.

2. The computer system of claim 1 further configured to cause low power mode in the processing portion in response to the switch circuit being activated during high power mode.

3. The computer system of claim 1 wherein the processing portion is configured to execute software that prompts a user to decide whether or not to cause lower power mode in the processing portion in response to the switch circuit being activated during high power mode.

4. The computer system of claim 1 wherein the interface bus has a power line for providing power to the peripheral device during high power mode.

5. The computer system of claim 1 wherein the switch circuit is coupled to the processing portion by a data line of the interface bus.

6. The computer system of claim 1 wherein the processing portion further comprises:
   bias circuit coupled to a secondary power source for applying a DC bias signal to a data line of the interface bus in response to low power mode in the processing portion, and for removing the DC bias signal in response to high power mode.

7. A peripheral device comprising:
   switch means for causing an activated status signal to be sent through an interface bus to a processing portion of a computer system in response to being activated, the status signal for causing high power mode to the processing portion, the switch means being configured to not load the interface bus in response to being activated during high power mode in the processing portion.

8. A peripheral device comprising:
   a switch for being coupled to a processing portion by a data line of an interface bus; and
   enable/disable circuit coupled to the switch for allowing an activated status signal to be sent through the data line of the interface bus in response to the switch being activated, the status signal for causing high power mode in the processing portion, the enable/disable circuit preventing the switch from directly affecting the data line of the interface bus during high power mode in the processing portion.

9. The peripheral device of claim 8 wherein said switch is a mechanical switch, the device further comprising:
   a switch detection circuit for detecting activation of the mechanical switch during high power mode and in response causing a notify data signal to be sent through the data line of the interface bus to the main processing portion, the notify data signal to be interpreted by a processor in the processing portion.

10. The peripheral device of claim 9 wherein the peripheral device is a keyboard and the switch detection circuit is part of a keyboard scanning circuit that is configured to access software by sending the notify data signal to be interpreted by the processor.

11. A peripheral device comprising:
    a switch for being coupled to a processing portion by a data line of an interface bus; and
    enable/disable circuit coupled to the switch for allowing an activated status signal to be sent through the interface bus in response to the switch being activated while the peripheral device is without power, the status signal for causing high power mode in the processing portion and in the peripheral device, the data line of the interface bus transmitting (1) normal data during said high power mode and (2) the status signal during low power, mode between the peripheral device and the processing portion.

12. A method of controlling power to a processing portion of a computer system, comprising:
    applying a DC bias signal to a data line of an interface bus; and then
    sending an activated status signal over the data line of the interface bus to the processing portion in response to a power-up switch circuit being activated; and then
    transitioning from low power to high power in the processing portion in response to detecting the status signal; and then
    removing the bias signal from the data line of the interface bus; and
    preventing the power-up switch circuit from directly affecting the data line of the interface bus when the switch circuit is activated during high power mode.

13. The method of claim 12 further comprising:
    sending a notify data signal over the data line of the interface bus to the processing portion in response to the power-up switch circuit being activated during high power mode, the power-up switch circuit not directly affecting the data line of the interface bus when activated during high power mode.

14. The method of claim 13 further comprising: performing a software routine prompting a user as to whether or not to cause low power mode in the processing portion in response to the notify data signal.

15. A device for being coupled to a computer interface bus, comprising
    a circuit for causing a second signal to be sent through an upstream portion of the interface bus in response to receiving a first signal through a downstream portion of the interface bus while a main processing portion of a computer system coupled to the interface bus is in low power mode, the circuit being configured to not affect the interface bus while the main processing portion is in high power mode.

16. The device of claim 15 wherein the first signal is received through a downstream data signaling line of the downstream portion and the second signal is sent through an upstream data signaling line of the upstream portion.

17. The device of claim 15 wherein the circuit is powered by a trickle power source in the device.

18. The device of claim 16 wherein the circuit comprises
    a bias generator for providing a bias on the downstream data signaling line of the downstream portion in response to low power mode in the main processing portion; and
    a detector for causing the second signal in response to detecting the first signal, the first signal being sensed on the downstream data signaling line, the low and high power modes being detected by the bias generator and the detector through the interface bus.

19. The device of claim 18 wherein the first signal is sensed as a change in the voltage on the downstream data signaling line.

20. The device of claim 18 wherein the bias generator removes the bias in response to said high power mode.

21. The device of claim 15 further comprising:
    a plurality of downstream ports for being coupled to a plurality of downstream portions of the interface bus, the circuit being further configured to cause the second signal to be sent in response to receiving one of a plurality of activated status signals through one of the plurality of downstream ports.

22. A computer peripheral device comprising means, in response to receiving a first signal through a downstream portion of an interface bus, for generating a second signal through an upstream portion of the interface bus while a main processing portion of a computer system coupled to the interface bus is in low power mode, and for not affecting the interface bus in response to the main processing portion being in high power mode.

23. The peripheral device of claim 22 further comprising computer peripheral circuitry for data communication over the interface bus, wherein the interface bus provides main power to the computer peripheral circuitry.

24. A method of signaling a transition between power modes in a computer system having a main processing portion, an interface bus, and first and second devices coupled to the interface bus, the method comprising:

the second device applying a DC bias to a downstream data signaling line of a downstream portion of the interface bus that connects with the first device, in response to the main processing portion being in low power mode; and then the second device generating a signal on an upstream data signaling line of an upstream portion of the interface bus in response to detecting a change in the voltage on the downstream line caused by the first device; and then transitioning the main processing portion from said low power mode into high power mode in response to the signal.

25. The method of claim 24 further comprising removing the bias from the interface bus in response to the main processing portion being in high power mode to allow normal data signaling between the second device and the first device.

26. A computer system comprising a main processing portion;

first and second peripheral devices;

an interface bus having a downstream portion and an upstream portion, the downstream portion coupled between the first and second peripheral devices, the upstream portion coupled between the second peripheral device and the main processing portion, the second peripheral device generating a second signal through the upstream portion in response to receiving a first signal from the first peripheral device through the downstream portion while the main processing portion is in a low power mode, the main processing portion transitioning from a low power mode into a high power mode in response to the second signal.

27. The computer system of claim 26 wherein the first and second signals are on data signaling lines of the interface bus.

28. The computer system of claim 27 wherein the second peripheral device applies a bias to data signaling lines of the upstream and downstream portions of the interface bus in response to the main processing portion of the computer system being in said low power mode and removes the bias in response to the main processing portion being in the high power mode.

29. The computer system of claim 26 wherein the first peripheral device comprises a switch coupled to the downstream portion, the first signal being generated in response to activation of the switch.

\* \* \* \* \*